United States Patent [19]

McCoy et al.

[11] Patent Number: 4,656,084

[45] Date of Patent: Apr. 7, 1987

[54] AQUEOUS SIZE COMPOSITION WITH PH REGULATOR

[75] Inventors: Richard A. McCoy, Columbus; Walter L. Reitter, Heath; Phra D. Lyle, Newark, all of Ohio

[73] Assignee: Owens-Corning Fiberglas Corporation, Toledo, Ohio

[21] Appl. No.: 517,739

[22] Filed: Jul. 29, 1983

Related U.S. Application Data

[63] Continuation of Ser. No. 274,966, Jun. 16, 1981, abandoned.

[51] Int. Cl.$^4$ ............................ B32B 7/00; B05D 3/02
[52] U.S. Cl. .................................... 428/266; 252/8.6; 252/8.9; 427/386; 427/387; 427/389.8; 428/268; 428/429
[58] Field of Search .................. 252/8.6, 8.9; 427/386, 427/387, 389.8; 428/378, 325, 379, 391, 388, 266, 268, 429; 65/3.41

[56] References Cited

U.S. PATENT DOCUMENTS

| | | | |
|---|---|---|---|
| 3,556,754 | 1/1971 | Marsden et al. | 65/3.41 |
| 4,039,716 | 8/1977 | Johnson | 252/8.9 X |
| 4,104,434 | 8/1978 | Johnson | 427/389.8 X |
| 4,110,094 | 8/1978 | Motsinger | 65/3.41 |

*Primary Examiner*—Thurman K. Page
*Attorney, Agent, or Firm*—Ronald C. Hudgens; Greg Dziegielewski; Francis D. Thomson

[57] ABSTRACT

Aqueous sizing compositions for glass fibers, comprising both epoxy- and acrylyl- or methacrylyl-functional organosilanes together with fiber-forming polymer and lubricant and pH regulator in a defined amount, are particularly suitable for glass fiber reinforcement for filament winding and pultrusion applications. The use of the pH regulator in the defined amount results in a strand tensile strength of significant improvement.

8 Claims, No Drawings

AQUEOUS SIZE COMPOSITION WITH PH REGULATOR

RELATED APPLICATIONS

This application is related to application Ser. No. 246,552 by the same inventors, filed Mar. 23, 1981, and is a continuation of U.S. application Ser. No. 274,966, filed June 16, 1981, both now abandoned.

TECHNICAL FILLD

This invention relates to the field of size coatings for glass fibers for use as reinforcement in resinous articles and includes aqueous sizing compositions by means of which the size coating is applied to the glass fibers, glass fibers lightly coated, i.e. sized, with a dried residue of such sizing compositions, and resinous articles reinforced with such sized glass fibers, particularly wound continuous filament reinforced pipes and tanks.

BACKGROUND ART

It has long been recognized that it is advantageous to provide a very light coating, known as a size or size coating, of suitable composition on glass fibers which are to be employed as reinforcing elements in resinous articles in order to enhance the mechanical reinforcing properties of the glass fibers when they are embedded in the matrix resin of the article to be reinforced. It has also long been recognized that it is advantageous to apply such size coatings to glass fibers by wetting the fibers with a liquid as soon as practicable after forming, frequently an aqueous liquid sizing composition which, when dried in situ, deposits the desired size as a residue lighly coating the surface of the glass fiber. The application of a suitable sizing composition at an early stage serves also to help protect the fibers from damage during the handling which they subsequently undergo, much of this handling being at high speeds or high stress, such as being gathered into multi-filament strands, collected into suitable packages, heated to dry and/or cure the size coating, shipped to the point of use, depackaged, incorporated into the matrix resin which the fibers are to reinforce and shaped with that resin into the desired articles. The size also tends to act as an adhesive to hold the individual filaments together in multi-filament strand.

Such sizing compositions typically contain a film-forming polymer, a lubricant and a coupling agent, all dispersed or dissolved in a liquid medium which is frequently an aqueous medium. The film-forming polymer is usually selected to be reasonably compatible with the matrix resin or resins in which the glass fibers will be embedded as reinforcement. A broad range of oils, waxes, surfactants, etc. have been employed as lubricants. Among the most frequently used coupling agents are organosilanes. Other components, such as surfactants, anti-static agents, colorants, biocides, anti-foam agents, pH regulators, etc., are also frequently included in such sizing compositions.

DISCLOSURE OF THE INVENTION AND THE BEST MODE FOR CARRYING IT OUT

In one of its aspects, the present invention is an aqueous sizing composition for glass fibers which comprises a film-forming polymer, a lubricant and a coupling agent and a pH regulator, said coupling agent comprising (i) a first organosilane having an epoxy group non-hydrolyzably linked to a silicon atom and at least two groups each of which is joined by a readily hydrolyzable bond to a silicon atom, or a hydrolysis product thereof, and (ii) a second organosilane having an acrylyl or methacrylyl group non-hydrolyzably linked to a silicon atom and at least two groups each of which is joined by a readily hydrolyzable bond to a silicon atom, or a hydrolysis product thereof, where each of said organosilanes is substantially devoid of halogen substitution in its non-hydrolyzable portion, and a pH regulator present in a quantity sufficient to impart to the size a pH within the range of from about 3 to about 4. This will usually require the presence of the pH regulator in an amount within the range of from about 0.385 to about 0.5 weight percent of the size. Any suitable pH regulator can be used including glacial acetic acid, citric acid and the like.

In another of its aspects, the present invention is a glass fiber having a size coating comprising the dried residue of an aqueous sizing composition of the invention.

In yet another of its aspects, the present invention is a cured resinous article having sized glass fiber of the invention embedded in the matrix resin thereof.

In a further aspect, the present invention is a cured resinous article in the form of a shell having the configuration of a pipe or tank and having the sized glass fiber of the invention embedded in the matrix resin as long, essentially continuous, multi-filament strand circumwinding the hollow portion of the article.

In a still further aspect, the present invention is a reinforced cured resinous article as described in which the matrix resin comprises a vinyl ester of an epoxy resin.

The film-forming polymer component of the aqueous sizing composition can be any suitable polymer which can be dispersed or dissolved in aqueous medium and which will coalesce to form a film when the sizing composition which has been applied to the glass fiber is dried. To achieve the most satisfactory reinforcing effects, the film-forming polymer component should be selected additionally for compatibility with the matrix resin in which the sized glass fibers will be embedded as reinforcing elements. Thus, for the sizing of glass fiber to be used as reinforcement for epoxy resins or vinyl esters of epoxy resins, epoxy resins are particularly suitable as the fiber-forming polymer component of the aqueous sizing composition of the invention. Epoxy resins are also suitable as the film-forming polymer in sizing compositions for glass fiber for reinforcing other curable matrix resins such as unsaturated polyester resins, but other film-forming polymers as suitable unsaturated polyesters, particularly for glass fibers for reinforcing unsaturated polyester matrix resin, can also be employed as the film-forming polymer of the sizing composition.

Where an epoxy resin is employed as the film-forming polymer in the aqueous sizing composition of the invention, diglycidyl ethers of substantially linear epichlorohydrin-bisphenol A condensates are particularly suitable, especially where the matrix resin in which the sized glass fibers are to be embedded as reinforcement comprises a vinyl ester of an epoxy resin. Such epoxy resins can advantageously be admixed with minor proportions of a solvent such as diacetone alcohol and/or xylene and this mixture dispersed in the aqueous medium of the sizing composition using a non-ionic surfactant such as a polyalkyleneglycol.

The lubricant component of the aqueous sizing composition of this invention can be any normally liquid or solid lubricating material suitable for the purpose. Such materials include vegetable and mineral oils, waxes of various types and certain materials which also have utility as surfactants, such as fatty acid monoesters of polyalkyleneglycols. In the context of the present invention, it has been found advantageous to employ a normally liquid lubricant material as at least part of the lubricant component of the sizing composition. It has been found particularly advantageous to employ as the normally liquid portion of the lubricant an isostearate monoester of a polyethyleneglycol, and, if a normally solid lubricant material is to be used therewith, to employ a normally solid stearate monoester of a polyethyleneglycol. The normally liquid lubricant material should preferably constitute at least about 50% by weight of the total lubricant in order that a fairly uniformly deposited size coating on the glass fibers can be more easily and consistently achieved in commercial production.

The coupling agent component of the aqueous sizing composition of the invention comprises two non-halogenated organosilanes, each of which has at least two groups joined by a readily hydrolyzable bond to a silicon atom of the silane, or hydrolysis products thereof. The first of these organosilanes also has an epoxy, i.e., oxirane, group linked through only non-hydrolyzable bonds to a silicon atom of such first silane. The second organosilane has, in addition to its hydrolyzable groups, an acrylyl or methacrylyl group linked through only non-hydrolyzable bonds to a silicon atom of such second silane; preferably the acrylyl or methacrylyl group is a acrylyloxy or methacrylyloxy group. By the terms "non-hydrolyzable" and "non-hydrolyably" are meant bonds or functional groups which are at least as resintant to hydrolysis as aliphatic organic carboxylic esters. Suitable hydrolyzable organosilanes include monosilanes containing the structure $>Si(OR)_2$, where the R's can be virtually any organic group, but lower alkyl groups such as methyl or ethyl are particularly convenient and satisfactory. As the first organosilane, a glycidoxy polymethylenetrialkoxysilane, such as 3-glycidoxy-1-propyltrimethoxysilane is particularly suitable. As the second organosilane, an acryloxy- or methacrylyloxypolymethylenetrialkoxylsilane such as 3-methacrylyloxy-1-propyltrimethoxysilane is particularly suitable. Preferably, the first and second organosilanes should be present in weight ratios from about 1:5 to about 1:1 respectively.

In the past, the addition of an acid to the size has been primarily for pH control and not believed to be critical. In a prior size of substantially identical composition, the amount of glacial acetic acid employed was sufficient to impart to the size a pH of about 4.5. However, it has now been unexpectedly found that, for a size of the composition herein set out, when the quantity of glacial acetic acid is increased to impart to the size a pH within the range of from about 3 to about 4, and preferably to a pH of about 3.7, strand tensile strength increased from about 200 M psi to about 265 M psi. In addition, the glass sized with the preferred amount of pH modifier therein, when employed as a filament winding for an anhydride cured epoxy pipe, showed a 400% improvement in cycles to weep.

The aqueous sizing compositions will preferably have the other non-volatile components present within the following approximate ranges, given as percent by weight of the total composition: 1–10% film-forming polymer, 0.2–5% lubricant and 0.2–5% coupling agent. The total solids content will preferably be from about 1 to about 25% and more preferably from about 3 to about 10%, by weight.

The aqueous sizing composition can be applied to the glass fibers by drawing the fibers over a roll, pad, or other suitable surface wet or flooded with the aqueous sizing composition, by spraying, by dipping, or by any other suitable means. The overall concentration of the non-volatile components in the aqueous sizing composition can be adjusted over a wide range according to the means of application to be employed, the character of the glass fibers to be sized, e.g. their diameter and composition, and the weight of dried size coating desired for the intended use of the sized fibers. Preferably, the sized fibers will have a loading of about 0.1 to about 5 percent by weight of dried size.

The sized glass fibers of the invention can be incorporated into the curable matrix resin which is to be reinforced thereby in the final cured resinous article as either monofilament or multi-filament strand, the latter being more usual and preferred, and as either long, essentially continuous, elements or short chopped pieces, depending upon the shape and method of fabrication of the article to be formed. The sized glass fibers of this invention are particularly adapted for use in the form of long, essentially continuous, multi-filament strand in reinforcing cured resinous articles such as pipes or tanks fabricated by filament winding, whereby the sized glass fibers are embedded in the liquid matrix resin by winding them about a suitable form while simultaneously applying the liquid matrix resin to that form, as by loading the glass fiber strand therewith as it approaches the winding form upon which the article is being constructed. The matrix resin is subsequently cured to provide the final reinforced resinous article. The sized glass fibers of the invention in the form of long multi-filament strand are also particularly adapted for use in reinforcing cured resinous articles formed by so-called pultrusion processes, wherein the strand of sized fibers is drawn through a zone where it is immersed in the liquid matrix resin and then pulled through a shaping die whereby excess liquid resin is removed and the remaining resin having the glass fiber strand embedded therein is shaped into the desired cross-sectional form and then cured.

EXAMPLE 1

A preferred aqueous sizing composition has the following formulation:

| Component | Wt. % |
|---|---|
| Epoxy resin | 2.63 |
| Diacetone alcohol | 0.58 |
| Xylene | 0.29 |
| Poly(ethyleneglycol/propyleneglycol) copolymer | 0.58 |
| 3-Methacryloxypropyltrimethoxysilane | 0.66 |
| 3-Glycidoxypropyltrimethoxysilane | 0.30 |
| Polyethyleneglycolmonostearate (solid) | 0.44 |
| Polyethyleneglycolmonoisostearate (liquid) | 0.66 |
| Polyvinylpyrolidone (90,000 MW) | 0.08 |
| Glacial acetic acid | To a pH of 3.7 |
| Water | Balance |

The epoxy resin is a diglycidyl ether of an epichlorohydrin/bisphenol A condensate and has an epoxy equivalent weight of about 250. It is codissolved with the xylene and diacetone alcohol and that mixture then dispersed in part of the water with the poly(ethyleneglycol/propyleneglycol) as surfactant. The methacryloxysilane is premixed with part of the water and acidified with the acetic acid before adding to the epoxy dispersion. The epoxysilane is also premixed with part of the water and then added to the main mixture. Finally, the two polyethyleneglycol monoesters and the polyvinylpyrolidone are premixed together with part of the water and added to the main mxture. The total solids are about 5.35% and the pH about 3 to about 4. This sizing composition is particularly adapted for use on glass fibers gathered together to form multi-filament strand and then embedded as continuous reinforcement in the epoxy resin or vinyl ester of epoxy resin matrix of pipes or tanks formed by filament winding.

Example 2

Another preferred aqueous sizing composition has the same formulation as that of Example 1 except that the epoxy resin has an epoxy equivalent weight of about 625 and the proportion of polyvinylpyrolidone is increased to 0.15%. This sizing composition is particularly adapted for use on glass fibers gathered together into multi-filament strand and then embedded as reinforcement in epoxy resin or unsaturated polyester resin products formed by pultrusion.

INDUSTRIAL APPLICABILITY

The aqueous sizing compositions of this invention provide a means for producing glass fiber reinforced resinous articles having improved tensile and flexural strengths while simultaneously reducing the undesirable presence of fuzz during fabrication operations, as compared to prior sizing compositions.

Numerous variations and modifications of this invention will be apparent to those skilled in the art and are contemplated as being within the scope of this invention.

We claim:

1. An aqueous sizing composition for glass fibers which consists of a film-forming polymer in the form of an epoxy resin which is a diglycidyl ether of an epichlorohydrin-bisphenol A condensate and has an epoxy equivalent weight of about 250, a lubricant, an epoxy coupling agent and a pH regulator, said coupling agent comprising (i) a first organosilane having an epoxy group non-hydrolyzably linked to a silicon atom and at least two groups each of which is joined by a readily hydrolyzable bond to a silicon atom, or a hydrolysis product thereof, and (ii) a second organosilane having an acrylyl or methacrylyl group non-hydrolyzably linked to a silicon atom and at least two groups each of which is joined by a readily hydrolyzable bond to a silicon atom, or a hydrolysis product thereof, wherein each of said organosilanes is substantially devoid of halogen substitution in the non-hydrolyzable portion thereof, said pH regulator being present in an amount sufficient to impart to the composition a pH within the range of from about 3 to about 4.

2. An aqueous sizing composition according to claim 1 wherein said acrylyl or methacrylyl group is an acrylyloxy or methacrylyloxy group.

3. An aqueous sizing composition according to claim 1 wherein said second organosilane is 3-methacrylyloxy-1-propyltrimethoxysilane or a hydrolysis product thereof.

4. An aqueous sizing composition according to claim 1 wherein said first organosilane is 3-glycidoxy-1-propyltrimethoxysilane or a hydrolysis product thereof.

5. An aqueous sizing composition according to claim 4 wherein said second organosilane is 3-methacrylyloxy-1-propyltrimethoxy silane or a hydrolysis product thereof.

6. An aqueous sizing composition according to claim 1 wherein the weight ratio of said first to said second organosilane is from about 1:5 to about 1:1.

7. The aqueous size composition of claims 3 or 5 wherein said pH regulator is present in an amount of about 0.385 weight percent.

8. A glass fiber having a size coating comprising the dried residue of an aqueous composition of claim 1.

* * * * *